United States Patent
Siefer et al.

(10) Patent No.: US 9,967,955 B2
(45) Date of Patent: May 8, 2018

(54) POWER OVER ETHERNET LIGHTING SYSTEM WITH EMERGENCY MODE

(71) Applicants: Michael J. Siefer, Bremen, IN (US); David C. Bender, Bloomington, IN (US); Jonathan D. Ford, Bloomington, IN (US); Arthur A. Harper, III, Bloomington, IN (US)

(72) Inventors: Michael J. Siefer, Bremen, IN (US); David C. Bender, Bloomington, IN (US); Jonathan D. Ford, Bloomington, IN (US); Arthur A. Harper, III, Bloomington, IN (US)

(73) Assignee: Platformatics Inc., Bloomington, IN (US)

( * ) Notice: Subject to any disclaimer, the term of this patent is extended or adjusted under 35 U.S.C. 154(b) by 0 days. days.

(21) Appl. No.: 15/701,939

(22) Filed: Sep. 12, 2017

(65) Prior Publication Data
US 2018/0092191 A1 Mar. 29, 2018

Related U.S. Application Data

(60) Provisional application No. 62/400,968, filed on Sep. 28, 2016.

(51) Int. Cl.
*H05B 37/02* (2006.01)
*H02J 9/00* (2006.01)
(Continued)

(52) U.S. Cl.
CPC .......... *H05B 37/0263* (2013.01); *H02J 9/005* (2013.01); *H02J 9/02* (2013.01);
(Continued)

(58) Field of Classification Search
CPC .......... H05B 37/02; H05B 37/0254; H05B 37/0263; H05B 33/08; H05B 33/0842;
(Continued)

(56) References Cited

U.S. PATENT DOCUMENTS 7,321,302 B2   1/2008 Beghelli
8,457,793 B2   6/2013 Golding et al.
(Continued)

FOREIGN PATENT DOCUMENTS

CN     103293480     9/2013
WO     2017017546    2/2017

*Primary Examiner* — Thai Pham
(74) *Attorney, Agent, or Firm* — Liell & McNeil

(57) ABSTRACT

A power over ethernet lighting system includes a plurality of nodes electrically connected to a power/communication bus. Each of the nodes includes a PoE interface, a micro-controller and a PoE driver electrically connected to a PoE luminaire. At least one of the nodes is an emergency management node that includes a rechargeable battery and a PoE battery charger. The system has a maintained mode in which the PoE luminaire of each of the nodes is powered by electricity from the power/communication bus as controlled by the respective micro-controller, which is powered by one of the bus and the rechargeable battery. The system has an emergency mode characterized by a power loss on the power/communication bus, with the PoE luminaire of the emergency management node powered by the rechargeable battery as controlled by the micro-controller, which is also powered by the rechargeable battery.

20 Claims, 15 Drawing Sheets

(51) Int. Cl.
*H02J 9/02* (2006.01)
*H05B 33/08* (2006.01)

(52) U.S. Cl.
CPC ..... *H05B 33/0806* (2013.01); *H05B 33/0842* (2013.01); *H05B 33/0884* (2013.01)

(58) Field of Classification Search
CPC ... H05B 33/0884; H05B 33/0806; H02J 9/00; H02J 9/005; H02J 9/02
See application file for complete search history.

(56) References Cited

U.S. PATENT DOCUMENTS

| | | |
|---|---|---|
| 9,277,632 B2 | 3/2016 | Hegarty |
| 9,609,706 B2 | 3/2017 | Crenshaw |
| 9,679,448 B2 | 6/2017 | Koosha et al. |
| 2007/0263333 A1* | 11/2007 | Apfel ..................... H02H 9/041 361/91.1 |
| 2015/0195883 A1* | 7/2015 | Harris ................ H05B 33/0845 315/155 |
| 2016/0273722 A1* | 9/2016 | Crenshaw .......... H05B 33/0818 |

* cited by examiner

POWER OVER ETHERNET LIGHTING SYSTEM WITH EMERGENCY MODE

TECHNICAL FIELD

The present disclosure relates generally to power over ethernet (PoE) lighting systems for buildings, and more particularly to power over ethernet lighting systems that include both a maintained mode during normal operation and an emergency mode during times of power loss.

BACKGROUND

It is well known that commercial and public buildings are typically required to have a back up emergency lighting system in case of a power outage on a segment of the power grid supplying electrical power to the respective building. These emergency lights are often individualized units that include a rechargeable battery and one or more incandescent lights that are powered by the battery in the event of a power loss to the building.

More recently, there has been a growing interest in lighting systems for building using low voltage power over ethernet systems and associated PoE luminaires, which are often one or more light emitting diode (LED) arrays. Power over ethernet lighting systems allow for new capabilities that would be impossible or extremely difficult to accomplish with traditional power grid type lighting systems. Among the new possibilities with power over ethernet lighting systems is the ability to incorporate emergency lighting systems and strategies for the same, while still meeting all associated codes and regulations required for emergency management services.

The present disclosure is directed toward power over ethernet lighting systems that are operable in both the maintained mode during normal operations, and an emergency mode when there is a power loss.

SUMMARY OF THE DISCLOSURE

A power over ethernet lighting system includes a plurality of nodes electrically connected to a power/communication bus with a PoE interface. Each of the nodes is electrically connected to a PoE luminaire. Each of the nodes includes the PoE interface, a micro-controller and a driver electrically connected to the PoE luminaire. At least one of the nodes is an emergency management node that includes a rechargeable battery and a PoE battery charger. The micro-controller of the emergency management node is electrically connected to the rechargeable battery. The system has a maintained mode in which the PoE luminaire of each of the nodes, including the emergency management node, is powered by electricity from the power/communication bus as controlled by the respective micro-controller, which is powered by one of the power/communication bus and the rechargeable battery. The system has an emergency mode characterized by a power loss on the power/communication bus. The PoE luminaire of the emergency management node is powered by electricity from the rechargeable battery as controlled by the micro-controller, which is powered by the rechargeable battery.

DETAILED DESCRIPTION

Figure 1:
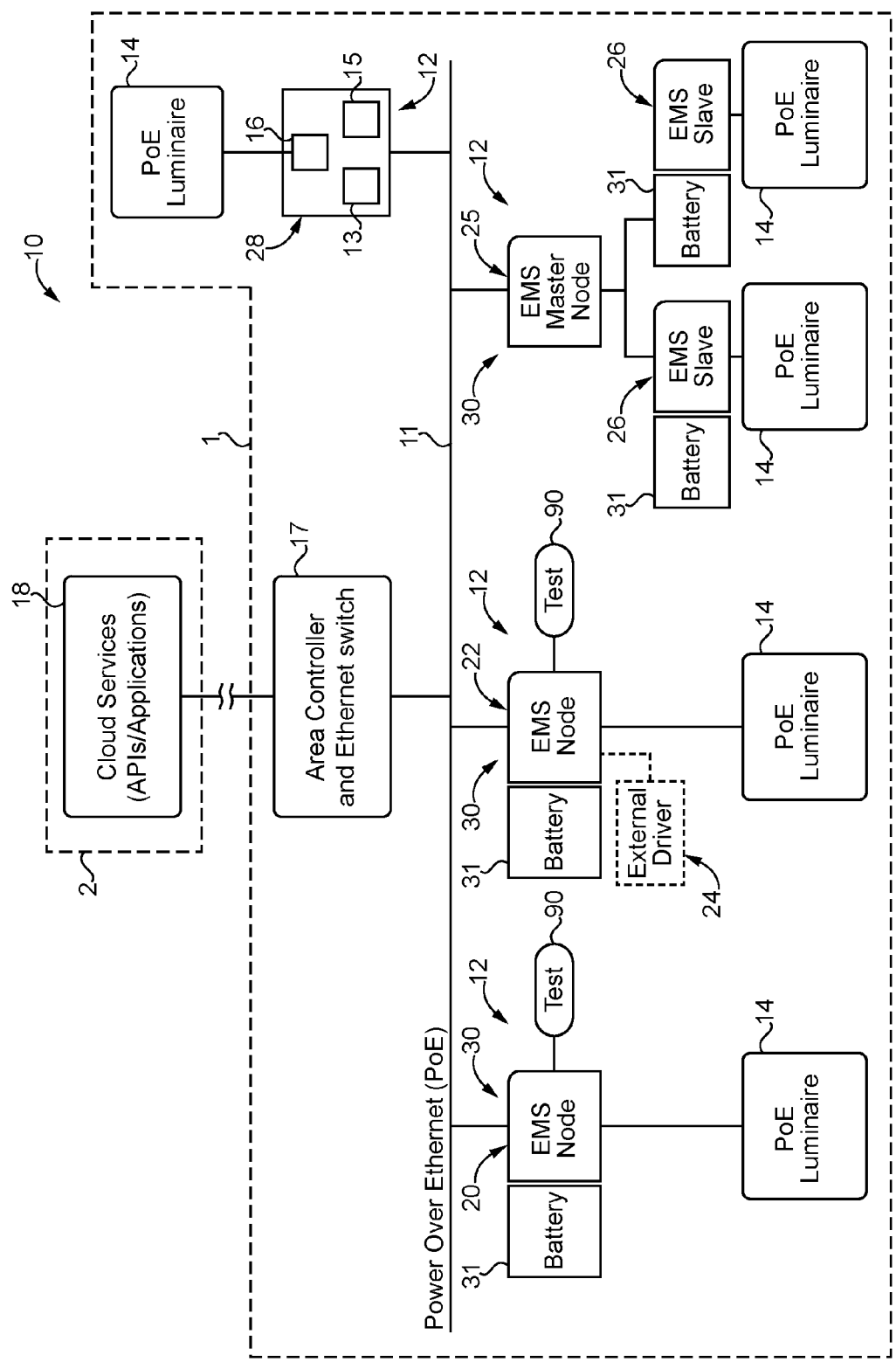
FIG. 1 is a schematic view of a power over ethernet lighting system according to the present disclosure in communication with a remote data storage and processing computer.

Referring initially to FIG. 1, a power over ethernet lighting system 10 includes a plurality of nodes 12 that are electrically connected to a power/communication bus 11 with a power over ethernet (PoE) interface 13. The PoE lighting system 10 may be installed in a first building 1 and be in communication with a remote location 2 that houses a remote data storage and processing computer 18. The remote data storage and processing computer 18 may be considered cloud services for system 10. Although the PoE lighting system 10 would likely have numerous nodes 12, the illustration of FIG. 1 shows a maintained node 28, which may be the most numerous, a master emergency management services (EMS) node 25 connected to two slave EMS nodes 26. In addition, the illustration shows a dual driver EMS node 22 and a single driver EMS node 20. In a typical installation, the PoE lighting system 10 will include numerous maintained nodes 28, which operate during normal day to day conditions, and a more limited number of EMS nodes 20, 22, 25/26 to facilitate lighting in the event of a power loss on the power/communication bus 11. Each of the nodes 12 is electrically connected to a PoE luminaire 14. In most instances, the PoE luminaire 14 will include one or more light emitting diode (LED) arrays. However, other electrically powered lights suitable for use with a power over ethernet system would also fall within the intended scope of the present disclosure. Preferably, each of the nodes 12 includes exactly one PoE interface 13. Each of the nodes 12 includes the PoE interface 13, a micro-controller 15 and a driver 16, which may occupy a common circuit board electrically connected to the PoE luminaire 14. In addition, each of the nodes 12 preferably include exactly one micro-controller, but a node board could include two or more micro-controllers without departing from the present disclosure. Each micro-controller is of a conventional design and commercially available to include a central processing unit, memory, software, timers/counters, possibly a real time clock and various analog and/or digital inputs and outputs. At least one of the nodes 12 in the PoE lighting system 10 is an emergency management node 30 that includes a rechargeable battery 31 and a PoE battery charger 32. The micro-controller 15 of each of the emergency management nodes is electrically connected to the rechargeable battery 31. In the illustrated embodiment, the emergency management node(s) 30 may be at least one of the single driver EMS node 20, a dual driver EMS node 22, or a master EMS node 25 coupled to one or more slave EMS nodes 26.

The PoE lighting system 10 has a maintained mode in which the PoE luminaire 14 of each of the nodes 12, including the emergency management node(s) 30, is powered by electricity from the power/communication bus 11 as controlled by the respective micro-controller 15, which is powered by one of the power/communication bus 11 and the rechargeable battery 31. Thus, in the maintained mode, each of the emergency management nodes 30 will be operated according to software stored on its respective micro-controller 15 which may be powered by the respective rechargeable battery 31, even when power exists on the power/communication bus 11. However, the emergency management nodes 30 may be configured such that their respective micro-controllers 15 are powered by the power/communication bus 11 when the bus is powered up, and then switch to their respective rechargeable battery 31 in the event of a power loss on power/communication bus 11. In other instances, the respective micro-controller 15 of the emergency management nodes 30 may be always powered by the rechargeable battery 31, even when power is present on the power/communication bus 11. The power over ethernet lighting system 10 also has an emergency mode characterized by a power loss on the power/communication bus 11. In the emergency mode, the PoE luminaire 14 of the emergency management node 30 is powered by electricity from the respective rechargeable battery 31 as controlled by software stored on the respective micro-controller 15, which is then powered by the respective rechargeable battery 31. The power over ethernet lighting system 10 may include a common area controller 17 that communicates with both the nodes 12 in building 1, and with the remote data storage and processing computer 18 (the cloud) at the remote location 2. The common area controller 17 may be electrically connected to the power/communication bus 11. Thus, those with skill in the art will recognize that the PoE lighting system 10 includes emergency management node(s) 30 that essentially operate as maintained nodes during normal power on power/communication bus 11, but also operate as emergency management nodes when there is a power loss on the power/communication bus 11. The different EMS nodes 30 shown in FIG. 1 vary from each other by their source of line power, which may be the power/communication bus 11 or some external AC or DC source, their respective methods of switching between line power and battery power, and the number of connected lights and power distribution.

Each of the plurality of nodes 12 are in communication with the common area controller 17, which is electrically connected to the power/communication bus 11. The common area controller 17 has an ethernet connection to, and is in communication with, the remote data storage and processing computer 18. Each of the EMS nodes 30 includes hardware in the form of a single circuit board, which may be one of several configurations discussed infra, as well as software with runs on the respective EMS node 30, and additional software that runs on other computing devices, such as the computer at the remote data storage and processing computer 18.

Figure 2:
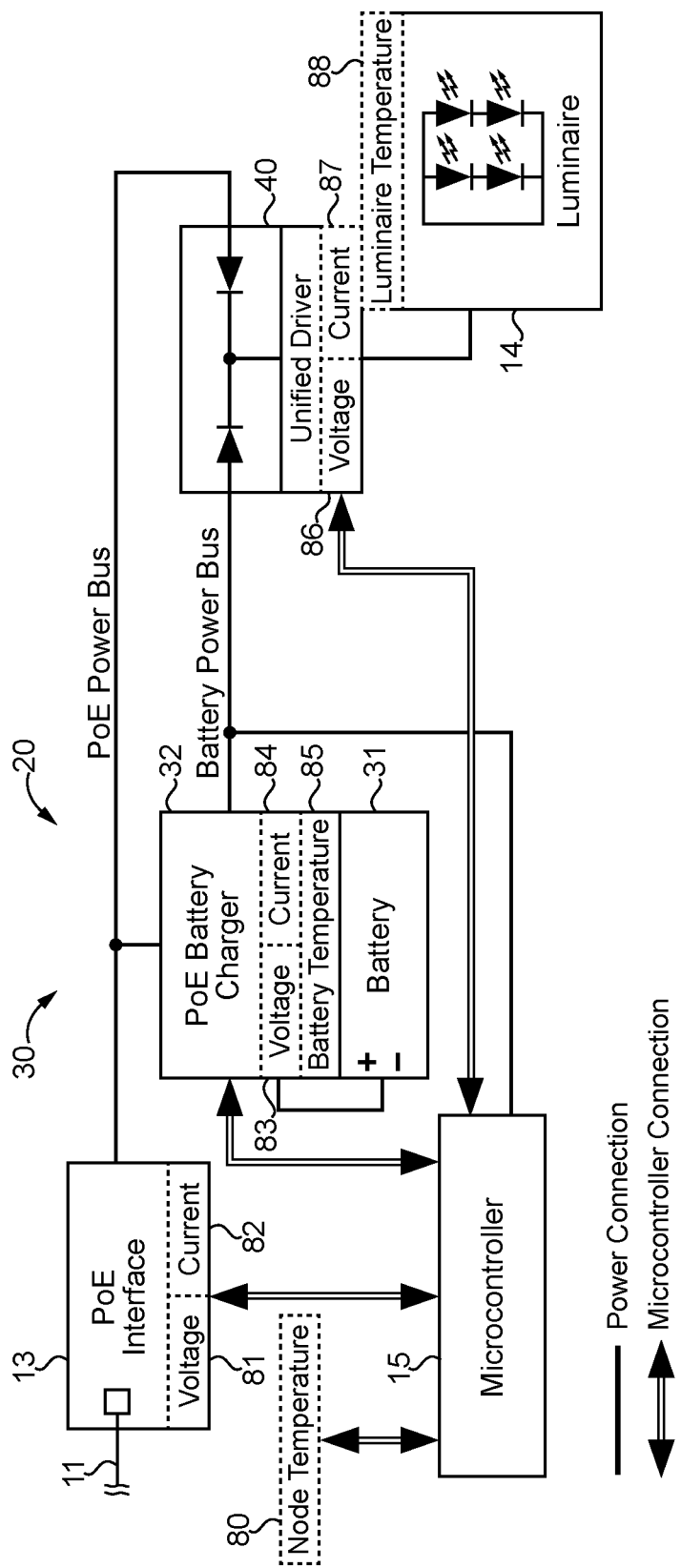
FIG. 2 is a schematic view of a first configuration of an emergency management node for the power over ethernet lighting system of FIG. 1.

Referring now to FIG. 2, an emergency management node 30 in the form of a single driver EMS node 20 is shown in greater detail. A convention used throughout the figures includes a solid line indicating a power connection and a double line that indicates micro-controller connections, such as for communication, sensor inputs and outputs. In the case of single driver EMS node 20, its driver 16 may include a unified PoE/battery driver 40 that switches between providing power to the PoE luminaire 14 from the power/communication bus 11 if power is present, or from the rechargeable battery 31 if there is a power loss on the power/communication bus 11. This may be accomplished without any switching circuitry utilizing opposing diodes as shown. This configuration may represent a cost-sensitive strategy in which the power source for the PoE luminaire 14 is inherently controlled by the unified PoE/battery driver 40 without intelligent control from micro-controller 15. Nevertheless, micro-controller 15 may be configured to monitor node temperature 80, voltage 81 at the PoE interface, current 82 in PoE interface 13, along with voltage 83 of battery 31, current 84 of battery 31 as well as battery temperature 85. In addition, micro-controller 15 may monitor voltage 86 and current 87 at unified driver 40, as well as the temperature 88 of the luminaire 14. This information may be stored in memory available to, or a part of, micro-controller 15, and communicated to the common area controller 17 which may make the information continuously available to the remote data storage and processing computer 18. Those skilled in the art will appreciate that the features 80/88 may represent conventional voltage, current or temperature sensors of a type well known in the art. Thus, the driver 16 of the single driver EMS node 20 is the unified PoE/battery driver 40, which is electrically connected to the PoE interface 13 with a first electrical connection 41, and electrically connected to the rechargeable battery 31 by a second electrical connection 42.

Figure 3:
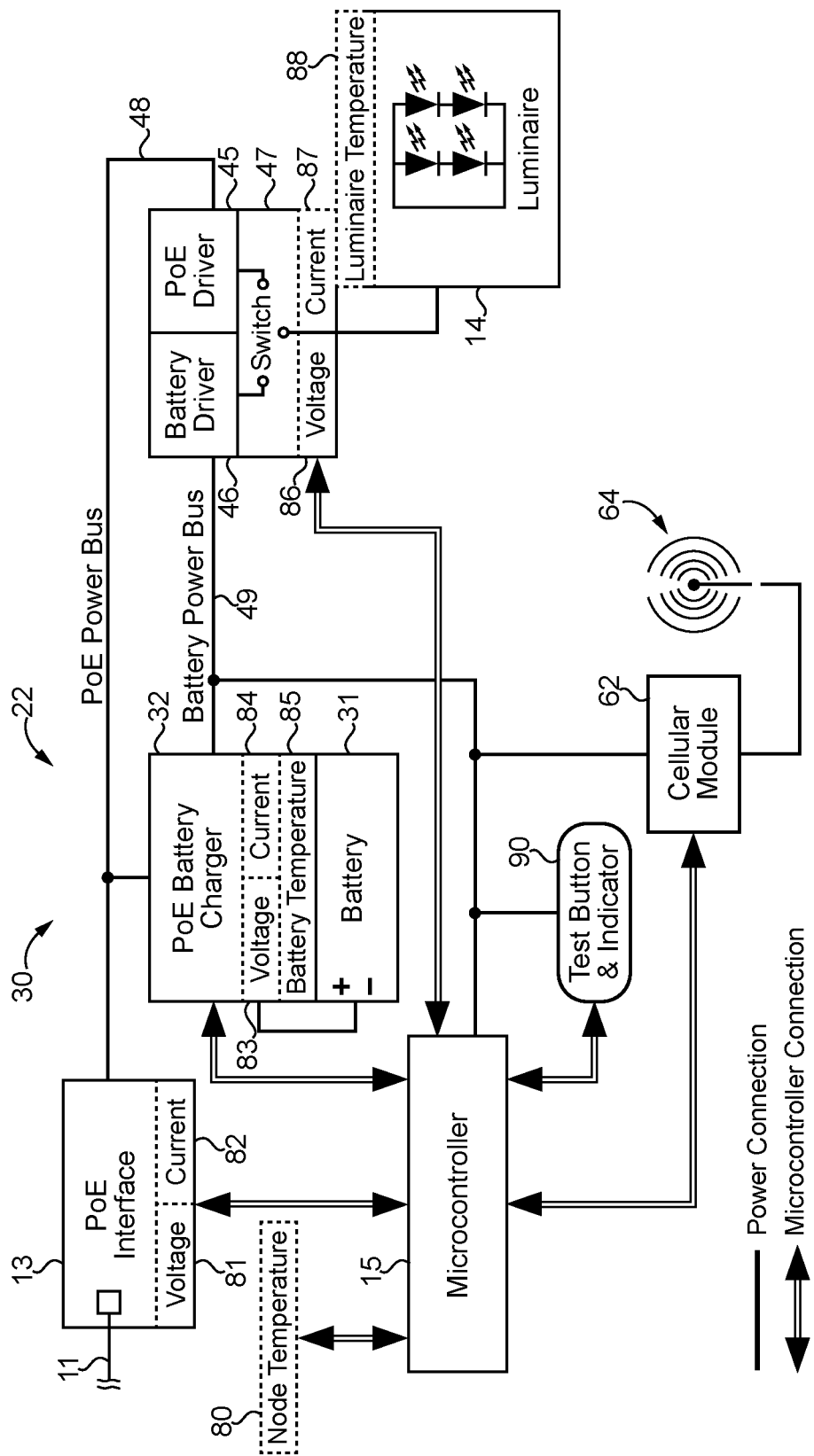
FIG. 3 is a schematic view of a second configuration for an emergency management node for the system of FIG. 1.

Referring now to FIG. 3, an emergency management node 30 may be configured as a dual driver EMS node 22. This alternative configuration may share all of the sensor 80-88 features discussed in relation to the single driver EMS node 20 of FIG. 2, but it differs in that the driver 16 includes both a PoE driver 45 and a battery driver 46 as well as a output switch 47. The PoE driver 45 is electrically connected to the PoE interface 13 via a first electrical connection 48, and the battery driver 46 is electrically connected to the rechargeable battery 31 by a second electrical connection 49. The output switch 47 is electrically connected to the PoE luminaire 14. The micro-controller 15 is in control communication with the output switch 47 to control the position of the switch based upon the presence or lack thereof of power on power/communication bus 11 as determined by micro-controller 15 by voltage and/or current data (81, 82) communicated to the micro-controller 15 from PoE interface 13. The dual driver EMS node 22 uses PoE as its primary line power, and like the configuration of FIG. 2, it changes over to battery power running off the attached rechargeable battery 31 when PoE fails. Unlike the configuration of FIG. 2, the dual driver EMS node 22 contains separate driver circuits for running on line power (PoE driver 45) and battery power (battery driver 46), and includes an automatic switching circuit that detects power failure and switches between the two sources as needed and as controlled by micro-controller 15. The extra circuitry of the dual driver EMS node 22 may provide greater reliability over the configuration of FIG. 2, probably at a greater cost, and is intended for applications with a greater reliability demand.

FIG. 3 is also of interest for showing that each EMS node 30 may include a test button and indicator 90 that is a familiar feature to most emergency lighting systems. The micro-controller 15 may be configured to change the output switch 47 from the PoE driver 45 to the battery driver 46 responsive to the test button 90 being pressed in a conventional manner. Micro-controller 15 may also store the timing and duration of a test responsive to the test button 90 being pressed, and may communicate that information to the remote data storage and processing computer 18 in due course. Those skilled in the art will appreciate that building codes may require each EMS node 30 to include a test button 90. Thus, an individual conducting a test may observe the luminaire 14 briefly going out and then relighting responsive to the output switch 47 changing from the PoE driver 45 to the battery driver 46. The micro-controller 15 of each emergency management node 30 may be configured to control the PoE luminaire 14 at a first level with power from the power/communication bus 11, and at a second level, which is different from the first level, with power from the rechargeable battery 31. For instance, the individual luminaires 14 may be configured to give off greater light when being operated in a maintained mode, but operate in a dimmer lower light level when operated in an emergency mode. Nevertheless, those two lighting levels could be the same without departing from the present disclosure.

FIG. 3 is also of interest for showing an emergency management node 30 with an optional cellular module 62 that is configured to establish a communication link with a wireless cellular network 64. The micro-controller 15 is in control communication with the cellular module 62. The micro-controller 15 may be configured to activate the cellular module responsive to a power failure on the power/communication bus 11, and communicate any stored or ongoing event data or other information to an intended recipient connected to the cellular module 62 over the wireless cellular network 64. For instance, the cellular module 62 may facilitate real time power failure notifications and/or may notify the remote data storage and processing computer 18 of a power failure. A programmable notification may then be sent to various users and responsible parties associated with PoE lighting system 10. The cellular module 62 may be connected to the EMS node 30 using its communication bus as well as connected to the commercial cellular network 64. The cellular module may be powered by the rechargeable battery 31. This solution may solve a problem of differentiating between a loss of communication with a node (or an entire site via the common are controller 17) due to loss of power or loss of communication due to an interruption in the normal ethernet-based communications path.

Figure 4:
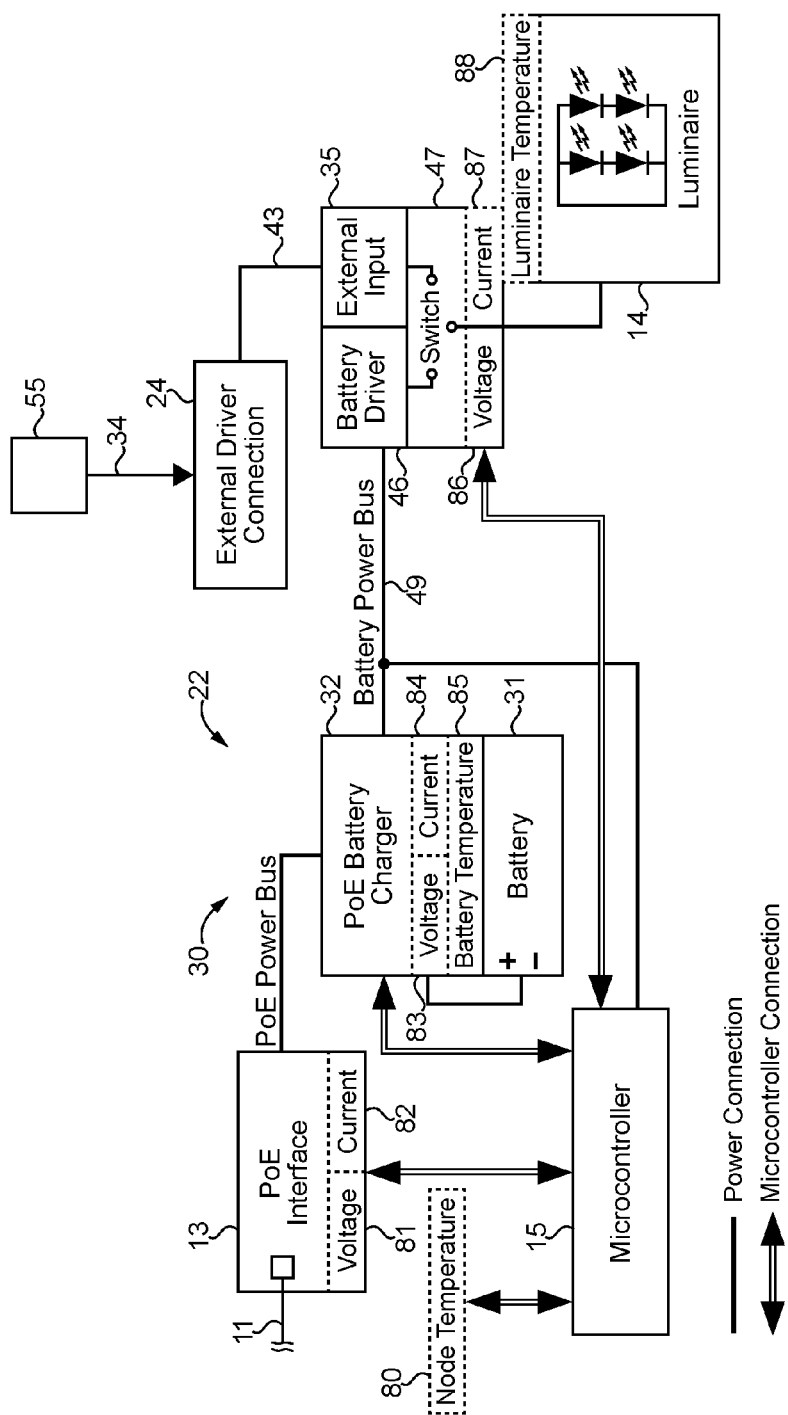
FIG. 4 is a schematic view of a third configuration for an emergency management node for the system of FIG. 1.

Referring now in additional to FIG. 4, there are many cases where users may want to keep their existing lighting infrastructure, but also want intelligent monitoring and battery maintenance and testing. FIG. 4 shows and alternative dual driver EMS node 22 with a similar auto switching configuration of FIG. 3, except that the driver 16 includes an external input driver 35 that is connected to an external driver connection 24 by a separate electrical connection 43, rather than being connected to the power/communication bus 11 as in the FIG. 3 configuration. The external driver connection 24 may be connected to an external power source 55 by an external power bus 34 in a conventional manner. External power source 55 may be AC or DC. Thus, the external input 35 may be considered as an external PoE driver 54 according to the present disclosure. The configuration in FIG. 4 powers the luminaire 14 from the external power source 55, but when this power source fails, the micro-controller 15 automatically changes the output switch 47 to power the luminaire 14 via the battery driver 46. As stated earlier, the external power source 55 is likely different from the power/communication bus 11. Like the previous configuration, the micro-controller 15 is in control communication with the output switch 47.

Figure 5:
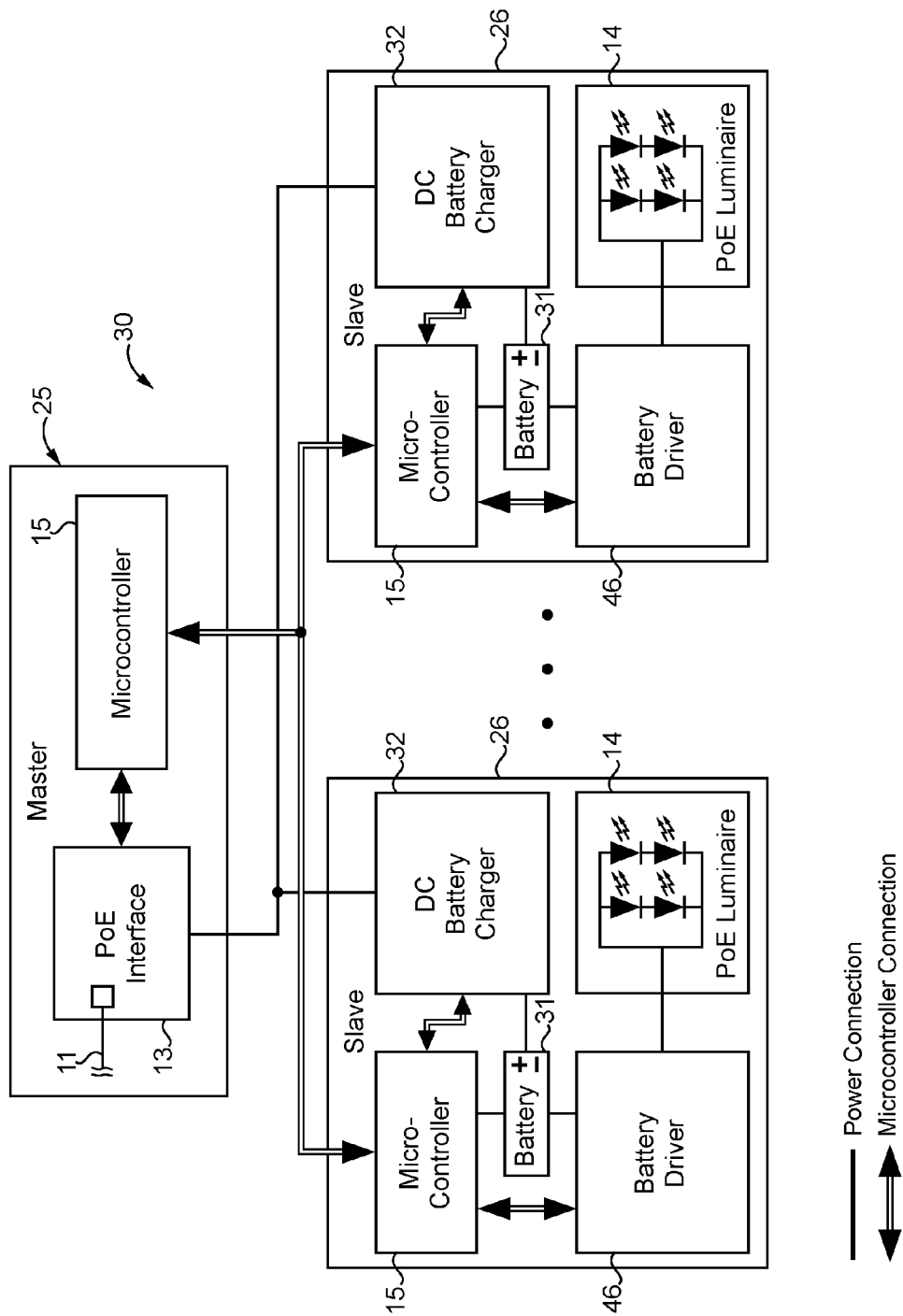
FIG. 5 is a schematic view of a master/slave emergency management node for the system of FIG. 1.

The EMS nodes 20 and 22 of FIGS. 2-3 are capable of providing significant power to their respective luminaires 14, which may be far more than is needed. For example, emergency exit signs require only low power for illumination. Referring to FIG. 5, these applications that include one or more low power lighting (e.g., emergency exit signs) may be suitable for the configuration shown in FIG. 5 in which a single master EMS node 25, which does not include a battery, provides communication and power for an arbitrary number of likely lower power demand slave EMS nodes 26. Thus, the master EMS node 25 includes the PoE interface 13 which is electrically connected to the power/communication bus 11 and a micro-controller 15 that is in control communication with the respective micro-controllers 15 associated with each of the slave EMS nodes 26. In addition, the slave EMS nodes 26 may be electrically connected to a shared PoE power bus 33 that is electrically connected to the power/communication bus 11 via the PoE interface 13 of master EMS node 25. Each of the slave EMS nodes 26 includes a micro-controller 15, a rechargeable batter 31, a DC battery charger 32 and a battery driver 46 that is electrically connected to an individual PoE luminaire 14, which may constitute a single LED light or a whole array. Although not shown, the individual micro-controllers 15 of the individual slave EMS nodes 26 may include some or all of the full array of sensors 80-88 discussed earlier with regard to the other EMS nodes 30.

Both under software control and when a power outage occurs, the EMS nodes 30 change seamlessly from line power (PoE line power in the configurations of FIGS. 2, 3 and 5 or foreign power in FIG. 4) to battery power. Under battery power, the EMS node 30 luminaire 14 is maintained for a period of time at a programmable level as per instructions stored on memory of the respective micro-controller 15. The programmable level may be different from the light's programmed maximum level on line power. For example, if a luminaire 14 is a maintained light, its programmed emergency level may be substantially lower than its normal level in order to maximize the duration in which the light can be kept on relying upon battery power alone. At minimum, the emergency level may be capable of meeting building code requirements for emergency lights. When on battery power, the micro-controller 15 is programmed to continuously adjust its output to maintain the light at a programmed level. After some period of time, some preprogrammed intelligent level adjustments may be made to maximize the additional time the light may be able to be kept powered using the remaining battery charge without causing undo battery wear. In other words, the micro-controller 15 may be configured to adjust the power level supplied by the battery responsive to a condition of the rechargeable battery. That condition of the battery may be an estimated remaining life span or other factors including but not limited to a current discharge rate from the battery, etc. Examples of such intelligent adjustments to power level supplied by the battery to the luminaire 14 include timer based cutoffs and calculated run down based on programmed priority or measurement.

One emerging focus in EMS systems is the ability to provide centralized, accurate and timely information about the state of luminaires 14, batteries 31 and other components based upon information gathered by the various sensors 80-88 identified earlier. Users often want to know that their EMS lighting system is fully functional at any given time, that it has been regularly tested and shown to perform as expected, and that no component failures are imminent. Meeting these expectations involves monitoring, testing and making predictions. Thus, micro-controllers 15 for power over ethernet lighting systems 10 according to the present disclosure may be configured to communicate battery condition data to the power/communication bus 11. The common area controller 17 can then communicate that information to the remote data storage and processing computer 18 for updating and maintaining a history of each individual node in order to predict readiness and other relevant aspects of the system. In general, software on the micro-controller 15 of each EMS node 30 continuously monitors a variety of mostly battery related information, including but not limited to battery current, battery voltage, battery temperature, line current, line voltage, node temperature, battery state (e.g., charging, discharging, or on-line), and a variety of events. These events can include but are not limited to timing and duration of a test button press, scheduled battery tests, scheduled battery full discharge, override battery tests, override battery full discharge, line power lost timing and duration, timing of line power restoration, battery depletion information and EMS light level changes (e.g., programmed level for when battery power is on). The emergency management node 30 in general, and the micro-controller 15 in particular, includes a memory in communication with or a part of the micro-controller 15. The micro-controller 15 is configured to store the battery condition data to the memory when the rechargeable battery is powering the PoE luminaire 14 of the emergency management node 30. Although other information could be considered battery condition data, at a minimum, battery condition data may include battery current, battery voltage, battery temperature and battery operation state at any given time. When able to communicate with the remote data storage and processing computer 18, the EMS node 30 may upload all monitored information. When no such communication is possible, such as for example when PoE power and communications are unavailable, the monitored information is temporarily saved on the memory of the EMS node 30, and then uploaded once communication is restored. This strategy provides gapless monitoring of the EMS information during power outages of limited duration. Monitored information stored in the remote data storage and processing computer 18 may be analyzed to provide users with valuable information such as a state of health value regarding a given rechargeable battery 31. In addition to communicating battery condition data, the micro-controller 15 may be configured to communicate event data to the power/communication bus 11 which may then be communicated to the remote data storage and processing computer 18 for further evaluation. Event data according to the present disclosure includes, but is not limited to time stamps relating to test commands, line power loss and duration and line power restoration timing.

Various compliance codes require periodic (often monthly) testing of emergency service lighting. Typically this is done by someone (e.g., a fire inspector) walking around a building that has EMS lighting pressing a test button connected to each EMS light, and determine and document that the system switches to battery power and that the EMS light is turned on responsive to pressing the test button. Some compliance codes also require less frequent battery capacity testing, usually on a yearly basis. In such a capacity test, the power over ethernet lighting system 10 is switched from line power to battery power responsive to a command communicated over the power/communication bus 11, and maintains the luminaires 14 on for some period of time (e.g., 90 minutes), and then recharges the battery to functional capacity within maybe 24 hours. With current industry standards solutions, this task is much for difficult to verify, as testing personnel may need to be present at various times over the course of more than 24 hours. The present disclosure solves this problem by providing automatic, scheduled testing with verifiable tracked results responsive to test commands communicated over the power/communication bus 11 and data gathered by the various sensors 80-88 during the test to verify, record and document compliance. Software operating on the micro-controller 15 of each EMS node 30 supports programmable scheduling for both functional and capacity testing. Both tests can be performed manually, overriding the programmed schedule. A functional test can be manually triggered through software or by pressing the test button 90 associated with a given EMS node 30. A capacity test can be triggered manually through software or by performing a pre-programmed sequence of timed presses of the test button. If a manual test has been performed during a test schedule (e.g., a functional test has already been run this week) and the system has collected its results, then the scheduled test may be skipped, if the micro-controller 15 is so configured. For each functional and/or capacity test, the PoE ethernet lighting system 10 generates a record, including but not limited to information such as time stamp of the test, duration of the entire test, battery discharge information, charging information when appropriate, and maybe an estimated battery life remaining at the end of the test. Discharge information may include duration of discharge portion during the test, battery current, voltage temperature measured at intervals during the test, and the light level for the luminaire 14 recorded at intervals during the test. Charging information may include the duration of the charging portion of the test, battery current, voltage and temperature measured at intervals during the test, and maybe estimated percent battery charged and estimated battery life, calculated for various times during the test. Because much of this information is stored at the remote location 18, users may be able to generate and view all testing history reports for the entire lifetime of a single EMS node 30 and its associated luminaire 14, for multiple EMS nodes 30 and associated luminaires grouped in an identified zone, or respectively defined groups of zones and lights (for example, an entire building site, or collection of EMS lights across sites).

In addition to accessing node histories and testing reports and other information, users may want to be notified immediately whenever various predetermined conditions arise. For example, a user responsible for managing multiple sites may want to know immediately of power failures at one or more of them so that a suitable manager can be contacted to attend to the problem. Such notifications may be sent from the remote data storage and processing computer 18, and may take the form of text messages, emails, or other mechanisms, such as internet or web-based protocols.

When a power failure event occurs, ethernet communication with the EMS nodes 30 is typically lost. Upon restoration of power, in addition to its normal ongoing monitoring, the EMS node 30 uploads all information captured during the power failure as described above. If the duration of the loss of power was greater than a programmable time period, resulting to total power loss, it may be that only the initial period of monitored data is preserved. Under normal operation, when operating with line power, the EMS node 30 sends periodic monitoring data to the remote data and storage processing computer 18. The collected data may be used to provide the following programmable user notifications: A power restoration event notifies users that power has been lost and has not been restored. A battery temperature warning notifies users that a battery temperature is outside of a configurable range, and may include the duration of the temperature deviation. Battery life warning may notify users that a certain identifiable battery 31 is below a configurable percent of its remaining expected life. Thus, one could expect each component of each EMS node to have an identifiable unique ID to differentiate from each component from among the many components in a given building site. A battery life rate warning may notify users that the rate of battery life decay for a certain battery 31 over a configurable life span of time, as such that the battery is predicted to not last the configurable or desired span of time. For example, a five year old battery's life may have dropped over the previous 10 months such that it can no longer be expected to have a total life span of 7 years. Industry standard regression estimation techniques may be used for this determination.

Figure 6:
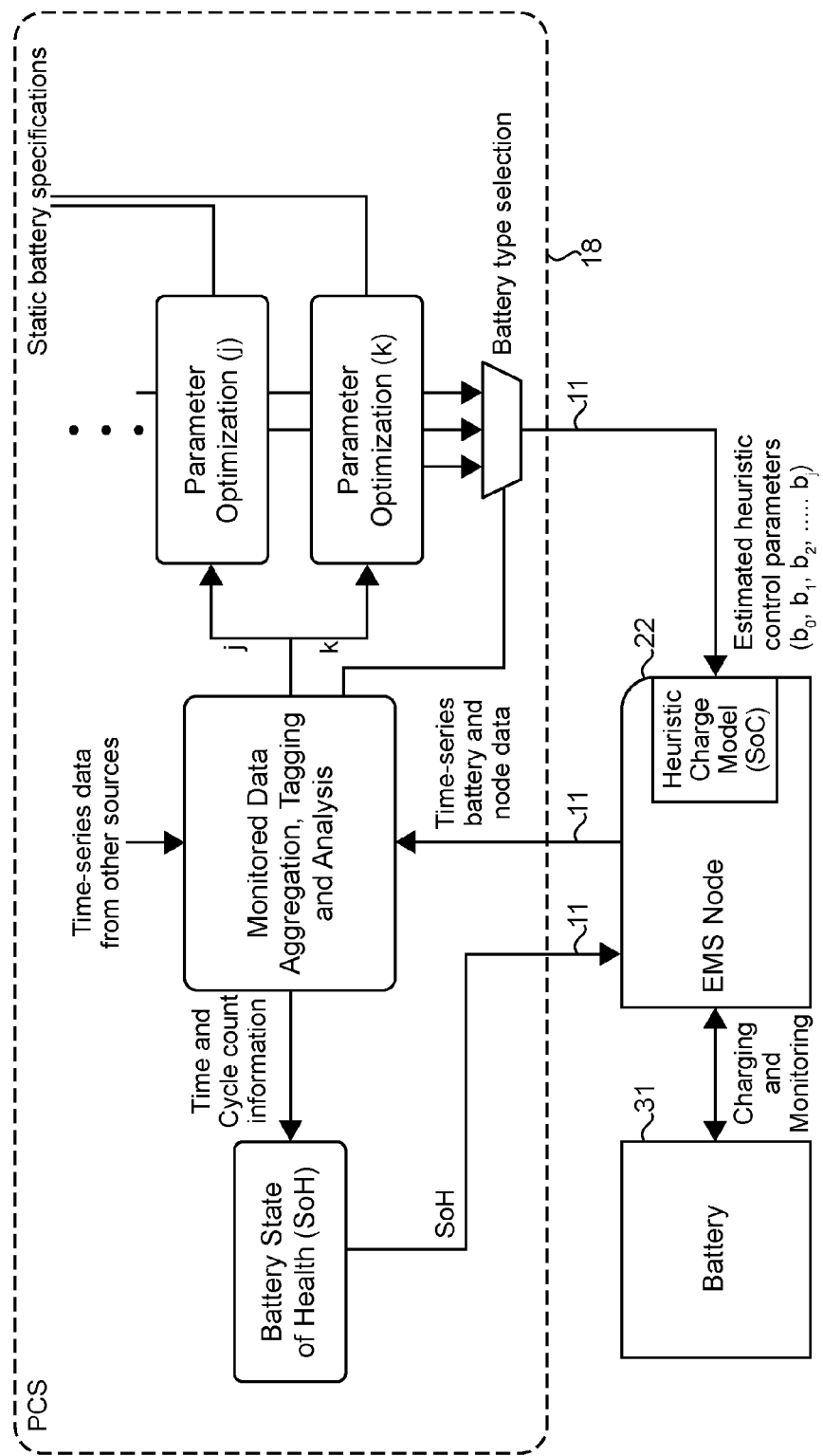
FIG. 6 is a schematic view of battery condition determination at a remote data storage processing computer according to the present disclosure.

Referring now in addition to FIG. 6, the EMS node 30 derives at least two primary metrics used to manage a battery's life span. These include state of charge (SoC) and a state of health (SoH) value. Both of these variables may be normalized to be assigned a value between 0 and 1. FIG. 6 shows an overall method for determining at a given EMS nodes 30 SoC. It is known that batteries with different chemistries and materials differ in their charge and discharge characteristics, and in their tolerance to charging and temperature extremes. For example, nickel cadmium batteries are less sensitive to overcharging than lithium ion batteries. In general, an EMS node may do nothing to recognize what kind of battery it is connected to. Instead, and as discussed above, the EMS node 30 continuously collects various time-series battery information-voltage, current, temperature, and so on—which are eventually uploaded for evaluation to the remote data and storage processing computer 18.

Based on information collected at each EMS node 30 (e.g., charge and discharge information, temperature) standard classification methods may be used to identify the kind of battery attached to each node 30. This function may be called monitored data aggregation tagging and analysis in FIG. 6, may apply a tag to each data measurement indicating the battery type. Each set of tagged monitoring data may then be fed, along with any relevant manufacturers information, into a process that optimizes battery charge parameters for that type of battery. For example, all monitoring data for battery type (k) in FIG. 6 is sent to the block labeled parameter optimization (k), and each of these optimization blocks may then produce a set of optimized heuristic charge constant, $b_0, b_1, b_2, \ldots, b_i$ that is periodically sent to all nodes 30 with the corresponding battery type. On the EMS node 30, a heuristic charge model process uses the charge constant provided by the remote data storage and processing computer 18 to govern battery charging processes, generating an online state of health value for the battery. An example algorithm of the heuristic charge model uses the linear model (Ehret, Pillar, Schorer, Jossen 2000) that derives the state of charge at the current time stamp as a linear function of the state of charge at the previous time step and the current (measured) battery voltage and current. Using this process, the EMS node 30 does not need to be configured for its connected battery, although a battery's specific configuration, which supersedes the calculated charge constant may also be specified. Additionally, the battery can be serviced or even replaced without servicing or reconfiguring the EMS node 30.

A battery's state of health value is a predicted measure of how much expected life the battery has left before it needs to be replaced. Unlike state of charge, which can be approximated or measured via proxy, state of health is by definition a predicted and estimated value. This estimation is performed wholly on the remote data storage and processing computer 18, and is primarily based upon battery history data and previous experience with a given battery 31. In FIG. 6, the monitored data aggregation, tagging and analysis process produces for each battery connected to an EMS node 30 several metrics as the result of analyzing recording charge and discharge data, as well as data supplied by battery manufactures. Some of these metrics are battery type, battery age, manufacturers specified range of lifetime charge cycles, number of charge cycles, temperature stress rating for each charge and discharge cycle, and quality rating of each charge cycle, which may be based upon the time taken to recharge the battery 31. The battery state of health block computes a weighted average of each of these factors producing a unit less normalized state of health value, which is periodically sent to the corresponding EMS node 30 for storing in the memory of the micro-controller 15. Thus, the remote data storage and processing computer 18 is configured to determine a battery's state of health value for the rechargeable battery 31 of the emergency management node 30 based upon node history data stored in the remote data storage. In addition, the remote processing computer 18 is configured to identify a battery type of the rechargeable battery 31 based upon node history data stored in the remote data storage.

Figure 7:
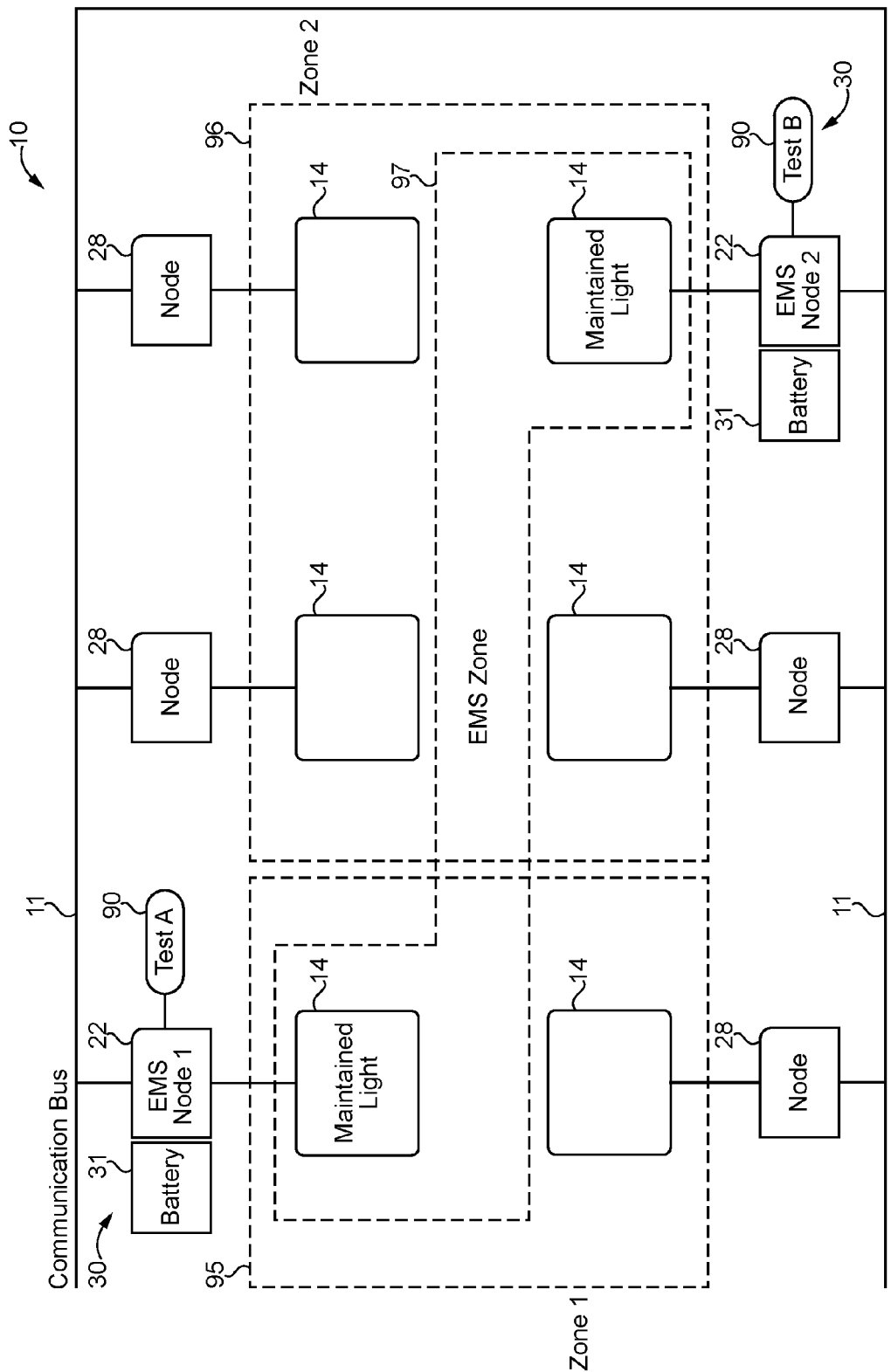
FIG. 7 is a schematic view of a power over ethernet lighting system showing a zone aspect of the present disclosure.

Referring now to FIG. 7, when an EMS luminaire 14 is configured as a dedicated EMS light, for the purpose of configuration and management it is treated as a single emergency light device. However, when the EMS luminaire 14 is configured to also operate as a maintained light, it is treated as two separate devices, as an emergency light device and as a non-emergency light device. For a maintained light, settings that pertained to the light when operating on line power are configured on the non-emergency light device; these devices are treated much the same as any other non-emergency light device associated with any of the maintained nodes 28. In contrast, settings that pertain to the light when on battery power are configured on the emergency light device (e.g., minimum/maximum light level etc.). Regardless of their location and to which node they are connected, EMS nodes 30 and their associated emergency light devices (luminaires 14) can be grouped together into logical zones. Zones may provide a way for users to set common configuration parameters and settings. For example, in FIG. 7, setting a temperature alarm for an EMS zone 97 applies the alarm to both lights in that zone. In particular, FIG. 7 shows a power over ethernet lighting system 10 that includes both maintained nodes 28 and their associated luminaires 14 along with two EMS nodes 30 and their associated test buttons 90. When operating in a maintained mode, there is a Zone 1 (95) that includes one maintained node 28 and one of the EMS nodes 30, and a Zone 2 (96) that includes three maintained nodes 28 and the other EMS node 30. Users can treat these different maintained zones with like programming and similar lighting levels. However, in the event of a power loss, a single EMS zone 97 includes both of the EMS nodes 30 from the respective maintained Zones 1 and 2. Beyond device configuration, multiple EMS nodes 30 in a given EMS zone 97 can be coordinated in testing and monitoring. For example, in FIG. 7 when someone presses the test button 90 connected to one of the EMS nodes 30, all other emergency lights in the EMS zone 97 switch to battery power. The same would happen if one were to press the test button 90 at the other EMS node 30 in the same EMS zone 97. Thus, the micro-controller 15 associated with a first emergency management node 30 is configured to communicate test button pressed data to the power/communication bus 11 responsive to the test button 90 being pressed. The micro-controller 15 of a second emergency management node 30 is configured to power the PoE luminaire 14 of the second emergency management node 30 from the rechargeable battery 31 of the second emergency management node 30 responsive to the test button pressed data from the first emergency management node 30. In a similar manner, scheduled or manual testing as described previously can effect an entire EMS zone 97. This may greatly streamline the process of manually testing EMS lights.

INDUSTRIAL APPLICABILITY

The present disclosure finds general applicability to lighting systems for buildings. The present disclosure finds particular applicability to buildings utilizing power over ethernet lighting systems that must include emergency management services to maintain some level of emergency lighting during a power loss.

Figure 8:
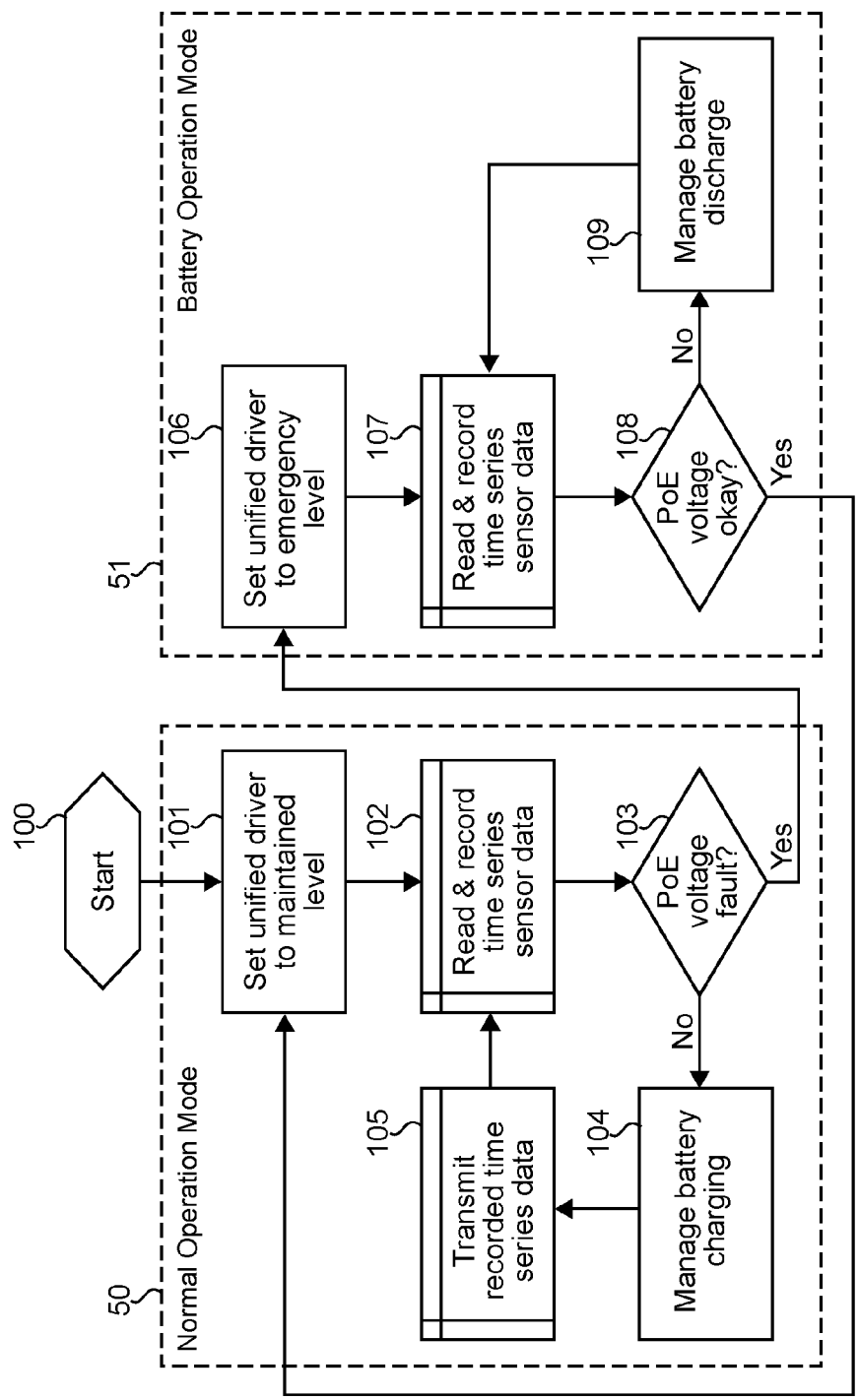
FIG. 8 is a logic flow diagram for operation of the emergency management node of FIG. 2.

Referring now in addition to FIG. 8, the logic flow diagram for some of the software executed by micro-controller 15 of the configuration shown in FIG. 2 is illustrated. In particular, and as discussed previously, each emergency management node 30 in general, and each single driver EMS node 20 in particular may be operated and either a maintained mode 50 or an emergency mode 51. The logic begins at start 100 and proceeds to block 101 where the unified driver 40 is set to a maintained level for operating luminaire 14. Next, at block 102, time series sensor data is read and stored based upon information from the sensors 80-88 discussed previously. Next, at query 103, there is a determination of whether there is a PoE voltage fault, such as associated with a power loss on the power/communication bus 11. If the answer is no, then the battery charging is managed at block 104. At block 105, the recorded time series data is transmitted to the power/communication bus 11, which may then be communicated to the common area controller 17 and then onto the remote data storage and processing computer 18. If the answer to query 103 is yes, then the EMS node 30 changes to the emergency mode 51 at block 106 to set the unified driver 40 to an emergency level, which may likely be a different and lower level from the maintained lighting level. At box 107, time series sensor data is again read and recorded. At query 108, there is a determination of whether the power loss event is over and that power is again available on the power/communication bus 11. If the answer is no, at block 109, the battery discharge is managed. Thereafter, the logic returns to block 107 to read and record the time series sensor data and again execute the query 108. Eventually, when the power is resumed, the answer to query 108 is yes and the logic again returns to block 101 to reset the unified driver 40 to the maintained level for luminaire 14.

Figure 9:
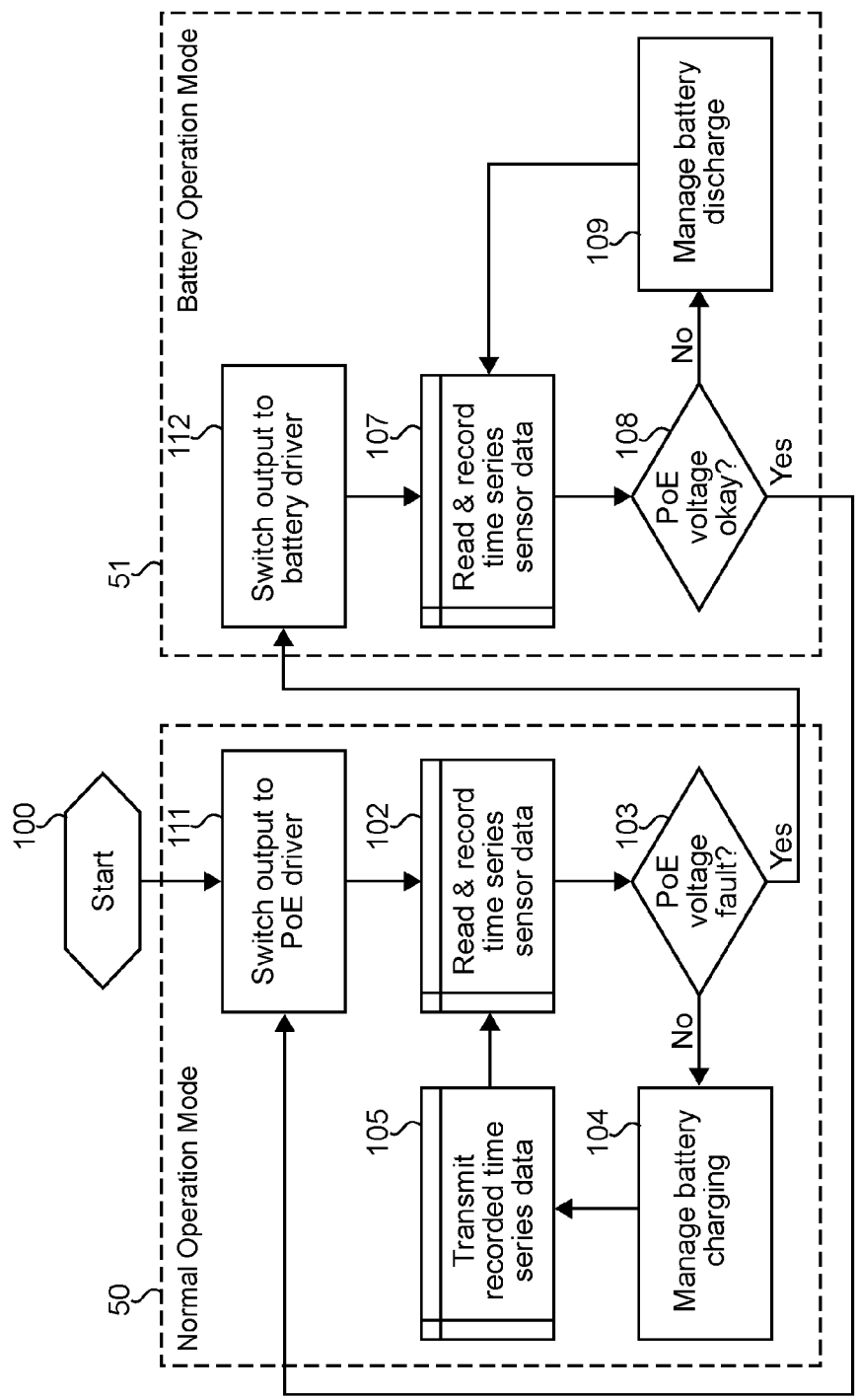
FIG. 9 is a logic flow diagram for the emergency management node shown in FIG. 3.
Figure 13:
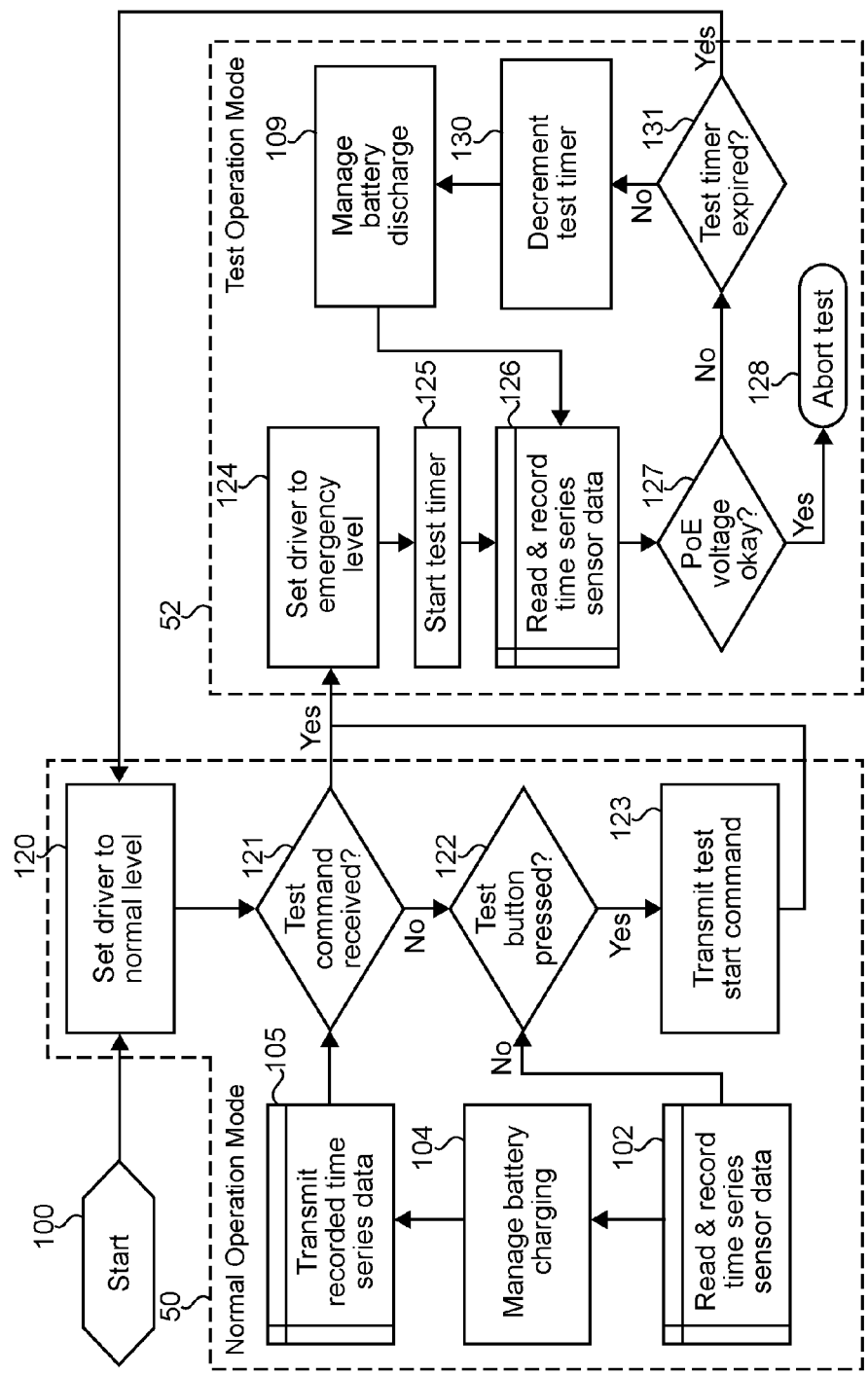
FIG. 13 is a logic flow diagram for test mode logic according to the present disclosure.
Figure 14:
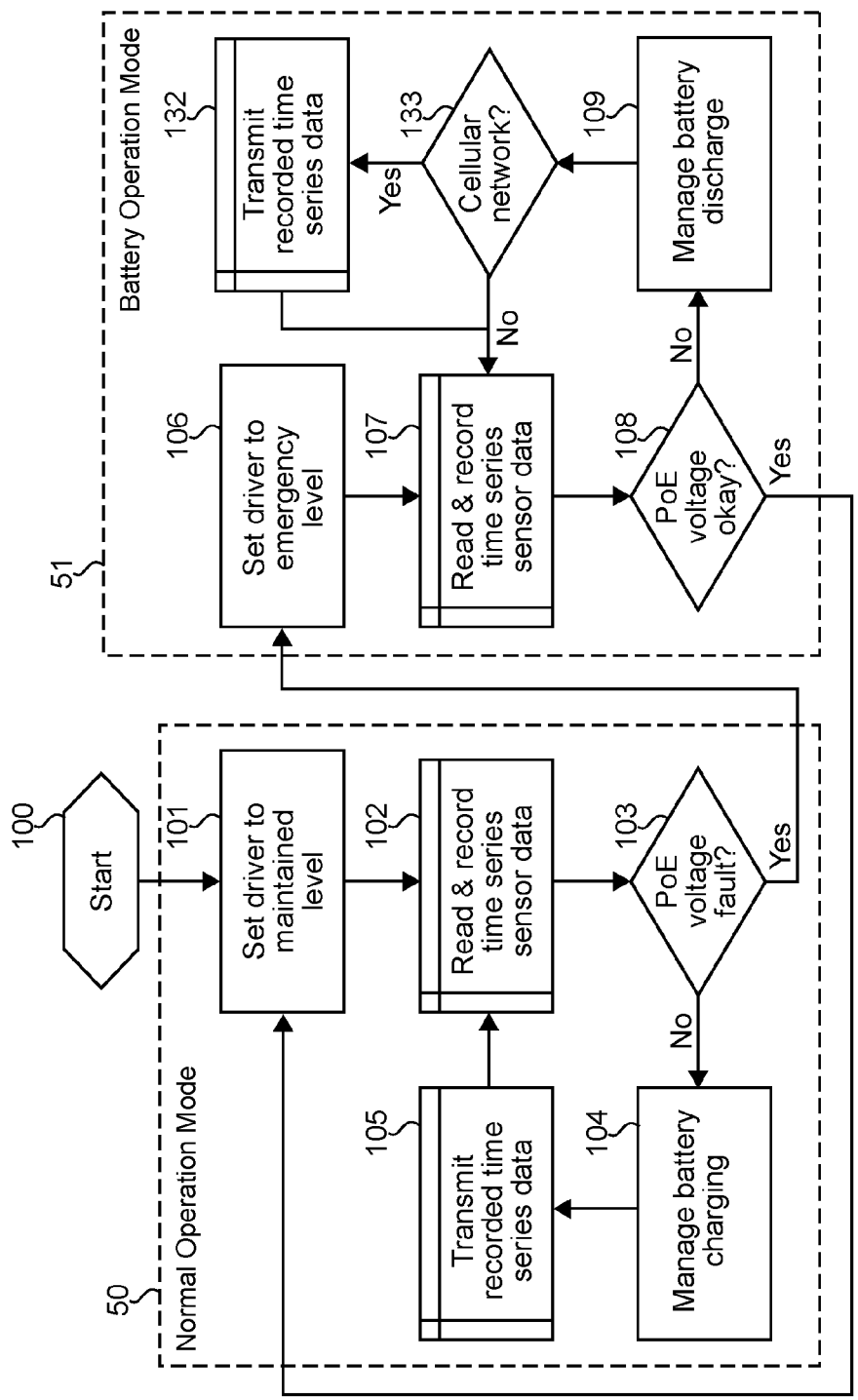
FIG. 14 is a logic flow diagram for an emergency management node that includes a cellular module according to an aspect of the present disclosure.

Referring now in addition to FIG. 9, the logic flow diagram for micro-controller 15 is association with the configuration shown in FIG. 3. is illustrated. Like numbers are used to identify identical process steps. For instance, the process logic begins at step 100 and advances to block 111 and the output switch 47 is set to supply power to the luminaire 14 from the PoE driver 45. If query 103 returns an affirmative indicating that there is a power loss on the power/communication bus 11, the logic changes from the maintained mode 50 over to the emergency mode 51 by advancing to block 112 where the output switch 47 is switched over to the battery driver 46 to now supply power to the luminaire 14 from the battery 31 according to a level of predetermined and stored in micro-controller 15. The remaining logic is similar to the earlier configuration. Referring in addition to FIG. 14, the logic may be enhanced if the emergency management node 30 is equipped with the cellular modular 62 as shown in FIG. 3. In such a case, and when operating in the emergency mode 51, a query 133 determines whether there is a cellular network 64 available. If yes, recorded time series data is transmitted at block 132 if the answer to query 133 is negative, then the logic operates virtually identical to that discussed earlier. Referring now in addition to FIG. 13, the logic may be further modified in association with an added test mode logic 52. At block 120, the driven 16 is set to a normal level. At query 121, there is a determination whether a test command has been received over the power/communication bus 11. If yes, then the emergency management system node 30 transitions into the test mode 52. When this occurs, at box 124 the driver 16 is set to the emergency level and the test timers is started at box 125 at box 126, time series sensor data is read and recorded. The logic then executes query 127 to determine whether there is a power outage on the power/communication bus 11. If the answer is yes, the test is aborted at block 128. If not, query 131 asks whether the test timer has expired. If no, the test decrement timer is executed at box 130 and the battery discharge management is executed at box 109. If the test timer has expired (query 131), the logic goes back to block 120 and returns to the maintained mode 50. In the event that test command query 121 returns a negative, query 122 asks whether the test button has been pressed. If no, the logic continues as described earlier in the maintained mode 50. If the query 122 returns a yes, the logic advances to block 123 to transmit a test start command to the power/communication bus 11, and maybe to other EMS nodes 30 in a same EMS zone as described earlier. Next, the logic advances to block 124 to commence operation in the test mode 52.

Figure 10:
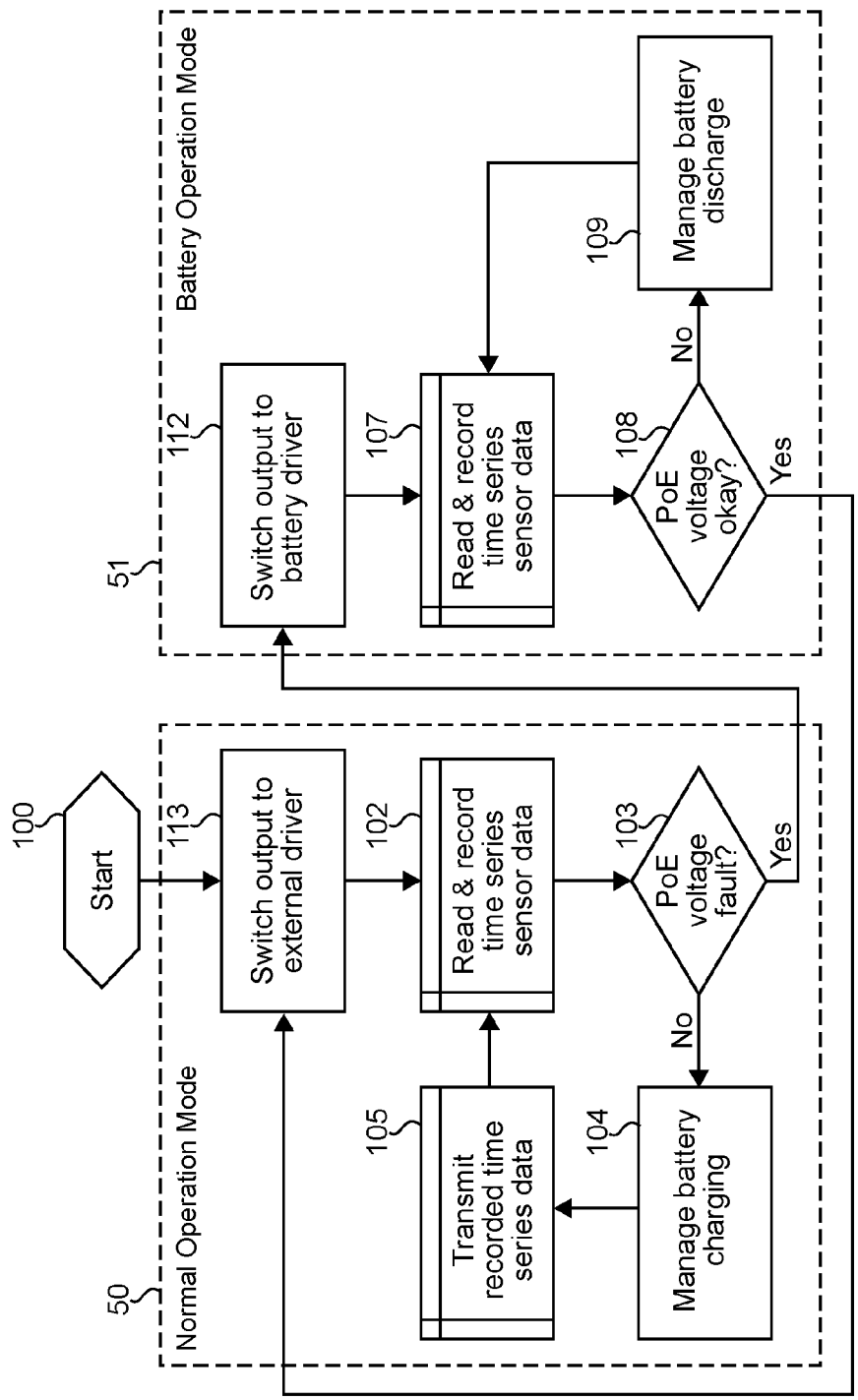
FIG. 10 is a logic flow diagram for the emergency management node shown in FIG. 4.

Referring now in addition to FIG. 10, the logic for operating the dual driver EMS node shown in FIG. 4 is illustrated. This logic includes many of the same steps as described early and those steps have identical numbers and will not again be repeated. However, after start 100, at block 113 the output switch 47 is set to receive power from the external input 35 and the external driver 54. In the even that query 103 indicates that a power loss has occurred in external power source 55, the logic transfers from the maintained mode 50 to the emergency mode 51, and the output switch 47 is changed over to the battery driver 46 to supply luminaire 14 with battery power from battery 31. The remaining portions of the logic are identical to that discussed previously.

Figure 11:
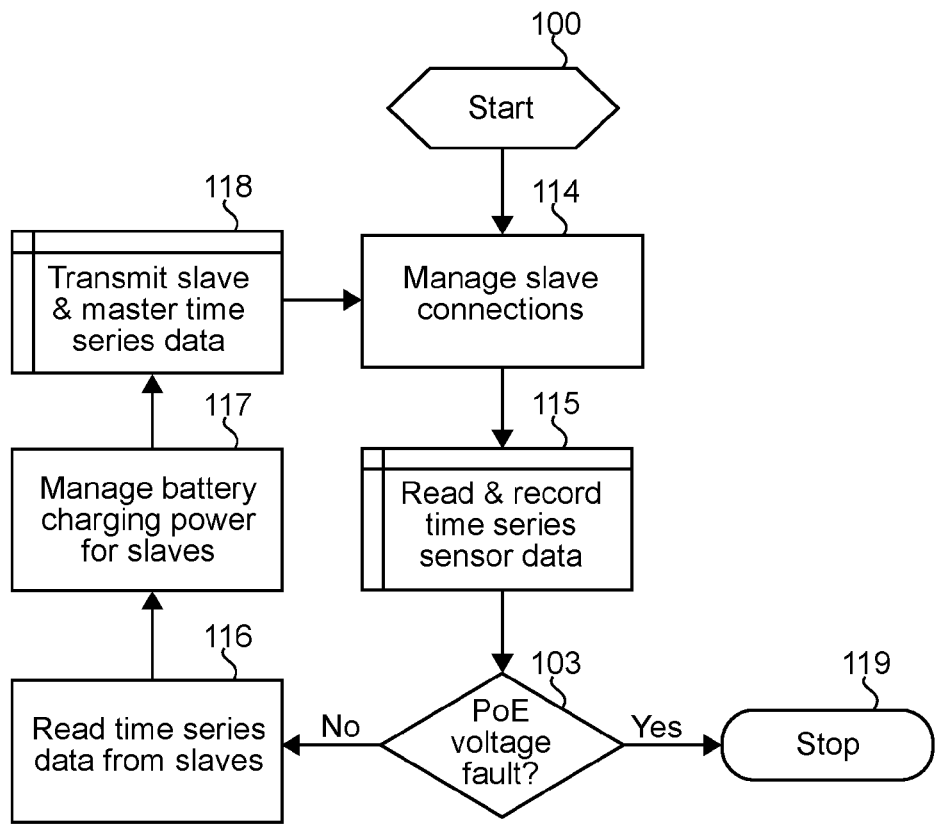
FIG. 11 is a logic flow diagram for the master node shown in FIG. 5.

Referring now in addition to FIG. 11, the logic flow diagram for the micro-controller 15 of the master EMS node 25 illustrated in FIG. 5 is shown. After start 100, at block 114 the slave connections are managed. At block 115, time series sensor data is read and recorded. At block 103, there is a determination as to whether a power failure has occurred on power/communication bus 11. If not, time series data is read from the slaves 26 at block 116. At block 117 the battery charging power for the slaves 26 is managed at block 117. At block 118 the slave and master time series data is transmitted to the power/communication bus 11 and on to the remote data storage and processing computer 18. If the query 103 returns an affirmative, the logic stops at block 119. The logic restarts when power returns to the power communication bus at 100 at some later time.

Figure 12:
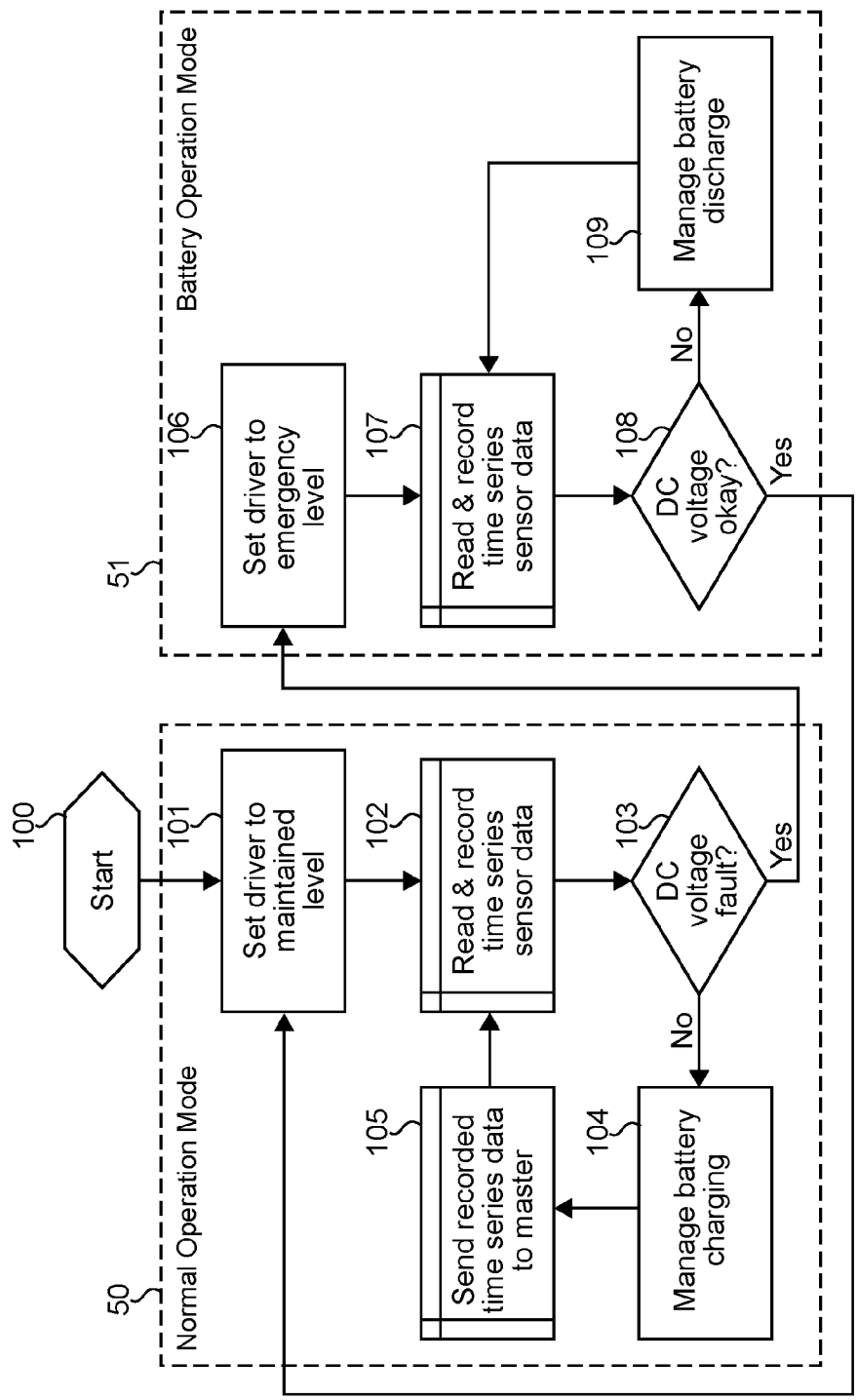
FIG. 12 is a logic flow diagram for each of the slave nodes from FIG. 5.

Referring now in addition to FIG. 12, the logic flow diagram for the individual slave EMS nodes 26 associated with the configuration shown in FIG. 5 is illustrated. The process starts at 100 and proceeds to block 101 where the driver 16 is set to a maintained level according to operation in the maintained mode 50. At block 102 the time series sensor data is read and recorded and at query 103 there is a determination of whether there is a loss of power on the PoE power bus 33, which in turn would indicate a power loss on power/communication bus 11. If no, the battery charging is managed at block 104 and the stored data is sent to the master node 25 at block 105. If the query 103 determines that there is a power loss, the slave EMS node 25 transfers into emergency mode 51 where the driver 16 is set to an emergency level and power is then supplied to luminaire 14 from battery 31 of the individual slave 26. At block 107, the time series sensor data is read and recorded and at query 108 there is a determination of whether the PoE power bus 33 and the power/communication bus 11 are back up. If not, the battery discharge is managed at block 109. If power is back up, the logic transfers back to the maintained mode 50 by resetting the driver 16 to the maintained level for the luminaire 14. The individual drivers 16 of each slave EMS node 26 can be a unified driver 40 as shown in FIG. 2 or be governed by an output switch 47 as shown in FIGS. 3 and 4 without departing from the present disclosure.

Figure 15:
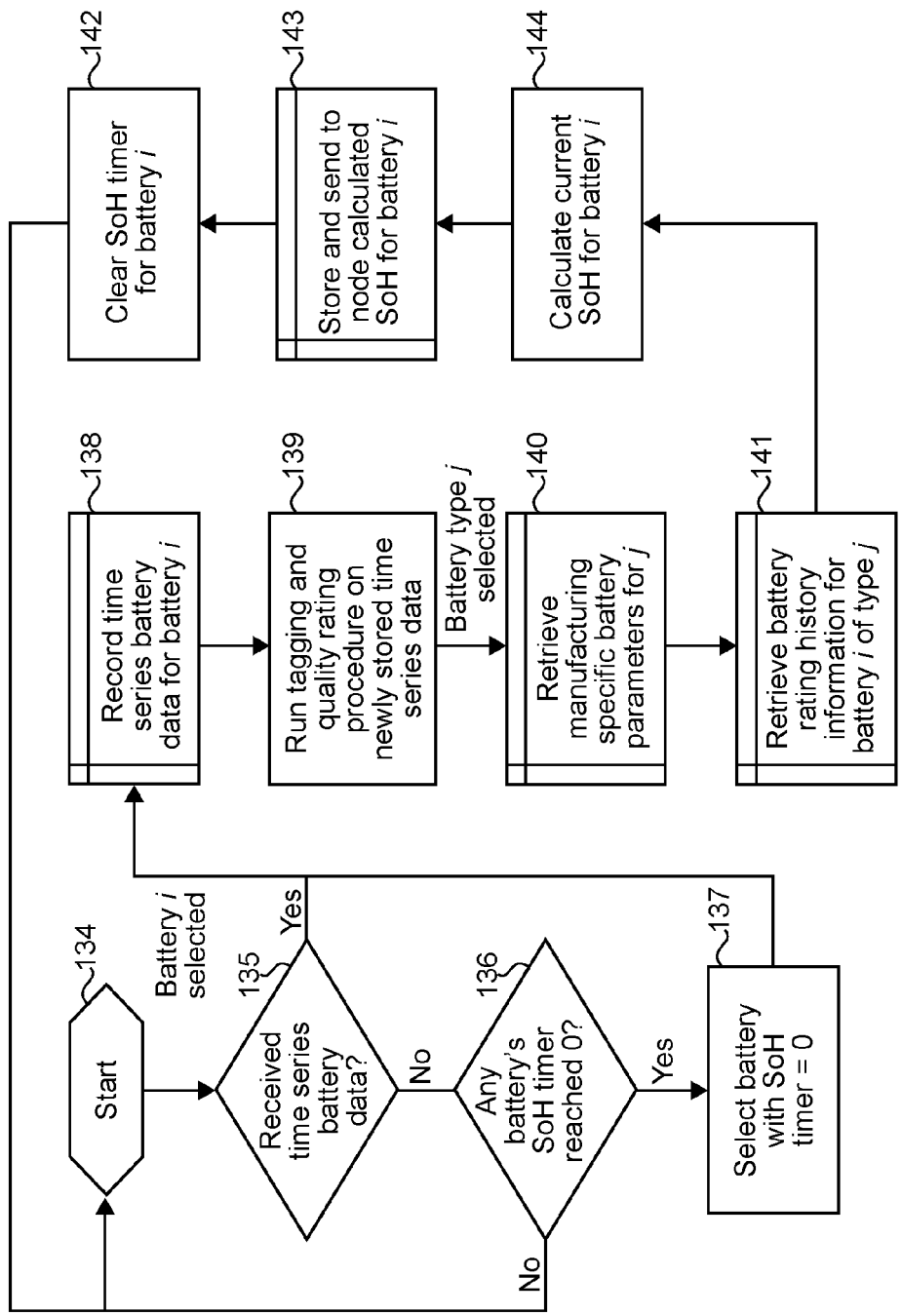
FIG. 15 is a logic flow diagram for processing battery condition data at the remote data storage and processing computer according to the present disclosure.

Referring again to FIG. 6 in addition to FIG. 15, a logic flow diagram for determining a battery of state of health value is illustrated. The logic starts at 134 and proceeds to query 135 to determine whether time series battery data has been received. If not, the logic may proceed to query 136 to determine whether the battery's state of health timer has reached zero. If no, the logic loops back to start 134. If query 135 returns a yes, the logic proceeds to block 138 to record the series battery condition data for a specifically identified battery of one emergency management node 30. At block 139, the tagging and quality rating procedure on newly stored time series data is executed for the selected battery and then at block 140, manufacturing data specific to that batter is retrieved, if available. At block 141, the node history data for that specific emergency management node 30 in general and that battery history data for that specific battery 31 is then retrieved from storage. Next at block 144, a current state of health value for the battery is calculated. This state of health value is then stored and sent to the specific EMS node 30 at block 143. At block 142, the state of health timer for that specific battery is cleared and the logic returns to start. If query 136 returns a positive, the selected battery 31 with a state of health timer equal to zero is selected and the logic then returns to block 138 as described.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A power over ethernet lighting system comprising:
   a power/communication bus;
   a plurality of nodes electrically connected to the power/communication bus with a PoE interface, and each of the nodes being electrically connected to a PoE luminaire;
   each of the plurality of nodes including the PoE interface, a micro-controller, and a driver electrically connected to the PoE luminaire;
   at least one of the nodes is an emergency management node that includes a rechargeable battery and a PoE battery charger, and the micro-controller is electrically connected to the rechargeable battery;
   wherein the system has a maintained mode in which the PoE luminaire of each of the nodes, including the emergency management node, is powered by electricity from the power/communication bus as controlled by the respective micro-controller, which is powered by one of the power/communication bus and the rechargeable battery; and
   wherein the system has an emergency mode characterized by a power loss on the power/communication bus, and the PoE luminaire of the emergency management node is powered by electricity from the rechargeable battery as controlled by the micro-controller, which is powered by the rechargeable battery.

2. The power over ethernet lighting system of claim 1 wherein the plurality of nodes are in communication with a common area controller electrically connected to the power/communication bus.

3. The power over ethernet lighting system of claim 2 wherein the common area controller has an ethernet connection to, and is in communication with, a remote data storage and processing computer.

4. The power over ethernet lighting system of claim 1 wherein the driver of the emergency management node is a unified PoE/battery driver, which is electrically connected to the PoE interface of the emergency management node with a first electrical connection, and electrically connected to the rechargeable battery by a second electrical connection.

5. The power over ethernet lighting system of claim 1 wherein the driver of the emergency management node is a PoE driver electrically connected to the PoE interface of the emergency management node by first electrical connection;
   the emergency management node includes a battery driver electrically connected to the rechargeable battery by a second electrical connection;
   an output switch electrically connected to the PoE luminaire; and
   the micro-controller of the emergency management node is in control communication with the output switch.

6. The power over ethernet lighting system of claim 1 wherein the driver of the emergency management node is an external driver electrically connected to an external power source that is different from the power/communication bus by a first electrical connection;
   the emergency management node includes a battery driver electrically connected to the rechargeable battery by a second electrical connection;
   an output switch electrically connected to the PoE luminaire; and
   the micro-controller of the emergency management node is in control communication with the output switch.

7. The power over ethernet lighting system of claim 1 including an emergency master node with a PoE interface electrically connected to the power/communication bus and in communication with a micro-controller of the emergency master node
    the emergency master node being electrically connected to a PoE power bus; and
    a plurality of slave nodes electrically connected to the PoE power bus; and
    each of the slave nodes including a rechargeable battery, a battery charger, a micro-controller, a battery LED driver and a PoE luminaire.

8. The power over ethernet lighting system of claim 1 wherein the micro-controller of the emergency management node is configured to control power to the PoE luminaire of the emergency management node at a first level with power from the power/communication bus, and at a second level, which is different from the first level, with power from the rechargeable battery.

9. The power over ethernet lighting system of claim 8 wherein the micro-controller is configured to adjust the second level responsive to a condition of the rechargeable battery.

10. The power over ethernet lighting system of claim 1 wherein the micro-controller of the emergency management node is configured to communicate battery condition data to the power/communication bus.

11. The power over ethernet lighting system of claim 10 wherein the emergency management node includes a memory in communication with, or part of, the micro-controller; and
    the micro-controller is configured to store the battery condition data to the memory when the rechargeable battery is powering the PoE luminaire of the emergency management node.

12. The power over ethernet lighting system of claim 10 wherein the battery condition data includes battery current, battery voltage, battery temperature and battery operation state.

13. The power over ethernet lighting system of claim 1 wherein the micro-controller is configured to communicate event data to the power/communication bus; and
    the event data includes test command, line power loss and line power restored.

14. The power over ethernet lighting system of claim 1 wherein the micro-controller is configured to power the PoE luminaire of the emergency management node from the rechargeable battery responsive to a test command communicated to the emergency management node on the power/communication bus.

15. The power over ethernet lighting system of claim 14 wherein micro-controller is configured to communicate battery condition data to the power/communication bus responsive to the test command.

16. The power over ethernet lighting system of claim 15 wherein a test command initiates a test event; and
    the micro-controller is configured to communicate test data for the test event to the power/communication bus; and
    the test data includes a timestamp, a test event duration and battery discharging data.

17. The power over ethernet lighting system of claim 1 wherein the emergency management node includes a cellular module configured to establish a communication link with a wireless cellular network; and
    the micro-controller of the emergency management node is in control communication with the cellular module; and
    the micro-controller is configured to activate the cellular module responsive to a power failure on the power/communication bus.

18. The power over ethernet lighting system of claim 1 wherein the emergency management node has an ethernet connection to, and is in communication with, a remote data storage and processing computer; and
    the processing computer is configured to determine a battery state of health value for the rechargeable battery of emergency management node based upon node history data stored in the remote data storage.

19. The power over ethernet lighting system of claim 18 wherein the processing computer is configured to identify a battery type of the rechargeable battery based upon node history data stored in the remote data storage.

20. The power over ethernet lighting system of claim 1 including a plurality of emergency management nodes that each include a test button;
    the micro-controller of a first emergency management node is configured to communicate test button pressed data to the power/communication bus responsive to the test button being pressed; and
    the micro-controller of a second emergency management node is configured to power the PoE luminaire of the second emergency management node from the rechargeable battery of the second emergency management node responsive to the test button data from the first emergency management node.

\* \* \* \* \*